US007957557B2

(12) United States Patent
Otsu et al.

(10) Patent No.: US 7,957,557 B2
(45) Date of Patent: Jun. 7, 2011

(54) TRACKING APPARATUS AND TRACKING METHOD

(75) Inventors: Nobuyuki Otsu, Tsukuba (JP); Masaaki Kawai, Tokyo (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 798 days.

(21) Appl. No.: 11/792,084

(22) PCT Filed: Dec. 9, 2005

(86) PCT No.: PCT/JP2005/016711
§ 371 (c)(1),
(2), (4) Date: Jan. 31, 2008

(87) PCT Pub. No.: WO2006/059419
PCT Pub. Date: Jun. 8, 2006

(65) Prior Publication Data
US 2008/0187172 A1    Aug. 7, 2008

(30) Foreign Application Priority Data

Dec. 2, 2004 (JP) .................................. 2004-349244

(51) Int. Cl.
*G06K 9/00* (2006.01)
*H04W 4/00* (2009.01)
(52) U.S. Cl. .......................... 382/103; 382/291; 455/461
(58) Field of Classification Search .................. 382/100, 382/103, 106, 107, 155, 162, 164, 168, 173, 382/181, 189, 199, 201, 224, 284, 232, 254, 382/274, 276, 291, 305, 312; 455/466, 461
See application file for complete search history.

(56) References Cited

U.S. PATENT DOCUMENTS

| 5,442,716 | A  | * | 8/1995  | Otsu et al. | 382/181 |
| 7,376,246 | B2 | * | 5/2008  | Shao et al. | 382/103 |
| 7,379,563 | B2 | * | 5/2008  | Shamaie | 382/103 |
| 7,616,782 | B2 | * | 11/2009 | Badawy | 382/107 |
| 7,623,733 | B2 | * | 11/2009 | Hirosawa | 382/284 |
| 7,853,275 | B2 | * | 12/2010 | Ito | 455/466 |

FOREIGN PATENT DOCUMENTS

| EP | 0 363 828 | 4/1990 |
| JP | 2101586  | 4/1990 |

(Continued)

OTHER PUBLICATIONS

International Search Report for PCT/JP2005/016711 mailed Nov. 15, 2005.

*Primary Examiner* — Seyed Azarian
(74) *Attorney, Agent, or Firm* — Nixon & Vanderhye P.C.

(57) ABSTRACT

A tracing device and a tracing method for realizing a real-time trace of a moving object such as a person from a time-varying image by method of a light processing load, and for learning features through the trace thereby to realize a trace of higher precision. The tracing device divides time-varying data inputted into partial images (in a strip or rectangle shape), and compares the background image containing no tracing object thereby with the current image thereby to extract the divided image having the tracing object. In order to discriminate the tracing object, moreover, the tracing device calculates the color high-level local self-correlated data, from which the features of color and shape can be extracted all at once, and performs the discrimination on the basis of a distance from the featuring data of the tracing object registered. The tracing device updates the background image and the registered featuring data into the latest ones. The features are acquired while tracing the tracing object, and the object is discriminated by utilizing the features so that a strong and highly precise trace can be realized.

9 Claims, 5 Drawing Sheets

FOREIGN PATENT DOCUMENTS

| | | |
|---|---|---|
| JP | 2101591 | 4/1990 |
| JP | 08-287258 | 11/1996 |
| JP | 08-329247 | 12/1996 |
| JP | 2000-90277 | 3/2000 |
| JP | 2004-240762 | 8/2004 |
| JP | 2004-240762 A * | 8/2004 |

* cited by examiner

Fig.6 ic # TRACKING APPARATUS AND TRACKING METHOD

This application is the US national phase of international application PCT/JP2005/016711 filed 9 Dec. 2005 which designated the U.S. and claims benefit of JP 2004-349244, dated 2 Dec. 2004, the entire content of which is hereby incorporated by reference.

TECHNICAL FIELD

The present invention relates to a tracking device and a tracking method for capturing a moving image to trace a target.

BACKGROUND ART

In recent years, increasingly higher needs exist for human harmonized, coexistent robots and information equipment which can be utilized in life support. It is necessary to have a coexistent robot recognize the environment and human actions, and human's visual system must be systematically implemented for tracking a moving object with eyes. Also, with an increase in the crime rate, demands have been increased for systems which are capable of accurately and rapidly acquiring information on a moving person, such as a monitoring camera and a video surveillance for examining recorded video images.

A number of studies have been already made on technologies for automatically tracking a moving object, which is required in applications as described above. There are a method of extracting and tracking an area of a moving object which is a target by extracting edge portions of the moving object from inter-frame differential images, a method of selecting an area of a moving object comprised of pixels which present a large flow, using an optical flow which is a velocity vector indicating how far and in which direction a point or a figure in an image will move at a next instance, and the like.

For example, the following Patent Document 1 discloses an object tracking method which uses both of an optical flow and motion information based on a correlation (matching) with a template image.

Patent Document 1: JP2004-240762A

DISCLOSURE OF THE INVENTION

Problems to be Solved by the Invention

The conventional automatic tracking systems described above take note of the similarity in images of a target area, and are aimed at tracking those which present high similarities. However, when a target to be tracked is hidden or passes by, or changes in orientation, size and the like, a track only relied on the similarity of images inevitably results in an insufficient identification accuracy of the target, giving rise to a problem of instable tracking operations. The conventional automatic tracking systems also have problems that they require an immense amount of calculations, rendering them unsuitable for real-time tracks, and are vulnerable to noise.

It is an object of the present invention to solve the problems as described above and provide a tracking apparatus and a tracking method which carry out real-time tracking using a method which involves a least possible processing load, and carries out highly accurate tracking at a recognition level by sequentially learning and updating features of a target through tracking.

Means for Solving Problems

The present invention is adapted to track a target while identifying a target, making use of features particular to the target, instead of matching (correlation) at image (pixel) level often seen in conventional approaches. For this purpose, the present invention employs a tracking approach which utilizes color higher-order local auto-correlation features, which can extract features such as the shape and color of a target all at once.

A tracking device of the present invention is mainly characterized by comprising image dividing means for dividing input moving image data to generate divided image data, extracting means for extracting background image data and different non-background image data from the divided image data, target presence/absence determining means for determining whether or not at least part of a target to be tracked is included in the divided images based on an output of the extracting means, feature data calculating means for calculating color higher-order local auto-correlation feature data for non-background image data determined to include the target, a target position determining means for collecting adjacent divided images determined to include the target to determine the position of the target to be tracked, an adding means for adding the feature data of the collected non-background image data, and identifying means for identifying the target to be tracked based on a distance between feature data of the registered target to be tracked and an output of the adding means.

Alternatively, a tracking device of the present invention is mainly characterized by comprising image dividing means for dividing input moving image data to generate divided image data, extracting means for extracting background image data and different non-background image data from the divided image data, feature data calculating means for calculating color higher-order local auto-correlation feature data for the non-background image data, norm calculating means for calculating a norm which is the length of a feature data vector from the color higher-order local auto-correlation data, target presence/absence determining means for determining whether or not at least part of a target to be tracked is included in divided images based on an output of the norm calculating means, target position determining means for collecting adjacent divided images determined to include the target to determine the position of the target, adding means for adding the feature data of the collected non-background image data, and identifying means for identifying the target to be tracked based on a distance between the feature data of the registered target to be tracked and an output of the adding means.

Also, the tracking devices described above, may comprise background image updating means for updating the background image based on the divided images which are determined not to include the target to be tracked by the target presence/absence determining means.

Further, in the tracking devices described above, the identifying means may comprise saving means for saving a plurality of close feature data for each target to be tracked, most recent feature data extracting means for calculating distances of all the saved feature data and feature data of a detected target to be tracked, respectively, to extract an odd number of feature data which have the shortest distance, and target identifying means for determining that the detected target belongs to a target to be tracked which has the largest number of feature data within the odd number of extracted feature data.

EFFECTS OF THE INVENTION

The higher-order local auto-correlation features are known to be effective features for identification of individuals such as face recognition and the like in previous studies. The present invention further extends the higher-order local auto-correlation features to the color, and employs color higher-order local auto-correlation features for simultaneously extracting information on the shape and color. The color higher-order local auto-correlation features are position invariant within an image, and can correctly recognize a target to be tracked irrespective of where the target is located within the image. Accordingly, the position (contour) of a target to be tracked itself need not be correctly detected or predicted, as is required for conventional image matching, and a more robust and accurate trace can be advantageously accomplished by tracking a target to be tracked while identifying the same at feature level.

Equivalently, the system of the present invention tracks a target to be tracked simultaneously with the acquisition of information from the target. As such, even if the target cannot be recognized due to the target being hidden or passing by another target or the like, the target can be continuously tracked by identifying the target after such a condition has disappeared.

Also advantageously, a small amount of calculations is required for extracting features, and real-time processing can be performed. Further advantageously, since respective divided image pieces can be processed in parallel, the processing speed can be further increased by processing them in parallel using a PC cluster or the like.

Further advantageously, since the system of the present invention does not make comparisons with a template image, no template need be previously provided, leading to improved general purpose properties. In addition, correct feature data can be immediately captured for a newly detected target, and the target can be accurately tracked independently of the size and motion of the target on images, even if the target changes over time in shape, color, and size as well as position.

DESCRIPTION OF REFERENCE NUMERALS

10 . . . Video Camera
11 . . . Video Capture Device
12 . . . Computer
13 . . . Monitoring Device
14 . . . Keyboard
15 . . . Mouse
20 . . . LAN
21, 22, 31 . . . PC
23 . . . Router
30 . . . Internet

MODE FOR CARRYING OUT THE INVENTION

The present invention performs the following process for estimating the position of a target to be tracked. First, an image is divided into strip-shaped (or rectangular) image pieces, and each strip divided image piece is examined to extract divided image pieces in which the target to be tracked exists.

While there are a variety of methods for extracting a target to be tracked, the present invention compares a background image which does not include a target to be tracked with a current image to extract divided image pieces in which the target to be tracked exists. By collecting adjacent divided image pieces in which the target to be tracked exists, a current position of the target to be tracked can be found. Also, feature data of the target to be tracked is generated and compared with registered data to identify the target to be tracked. Features are acquired while the target to be tracked is being tracked, and utilized to identify the target, thus carrying out a highly accurate trace.

First Embodiment

Figure 1:
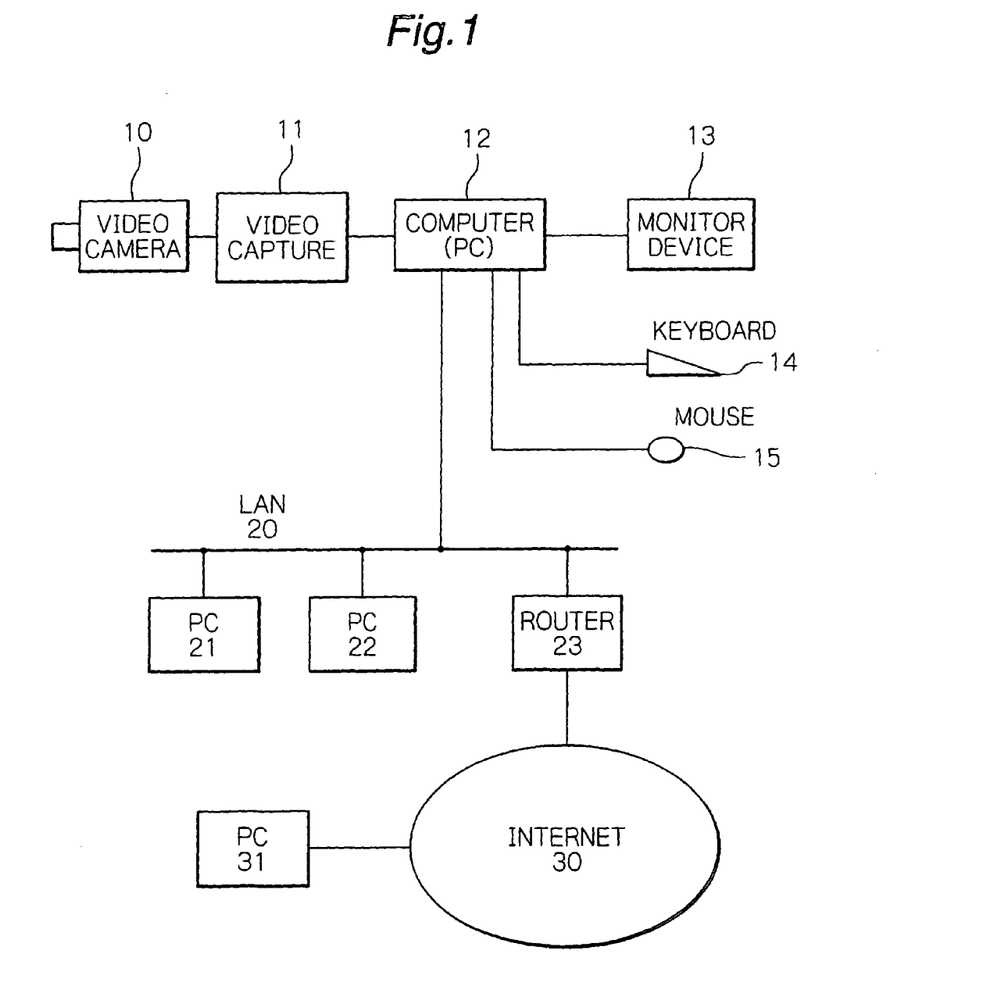
FIG. 1 is a block diagram illustrating the configuration of a tracking device according to the present invention.

FIG. 1 is a block diagram illustrating the configuration of a tracking device according to the present invention. A video camera 10 outputs color moving image frame data of a target person or device in real time. The color moving image data may comprise, for example, 256 levels of gradation for each of R, G, B. A computer 12 such as PC (personal computer) captures the color moving image frame data from the video camera 10 in real time through a video capture device 11 for capturing moving images.

The computer 12 is connected to a known monitor device 13, keyboard 14, mouse 15, and LAN 20. The LAN 20 is connected to the Internet 30 through a router 23, in addition to PC's 21, 22, so that the computer 12 can communicate with other PC's 21, 22 on the LAN, and PC 31 over the Internet. The tracking device of the present invention is implemented by creating a program for executing a process, later described, installing the program in the computer 11 and running the program thereon.

Other PC's 21, 22, 31 can be used as parallel processing devices in a tracking process or for remote display of tracking results. While the embodiment discloses an example of processing moving image data inputted, for example, from the video camera 10 in real time, the moving image data may be once saved in a moving image file and sequentially read out for processing.

Figure 2:
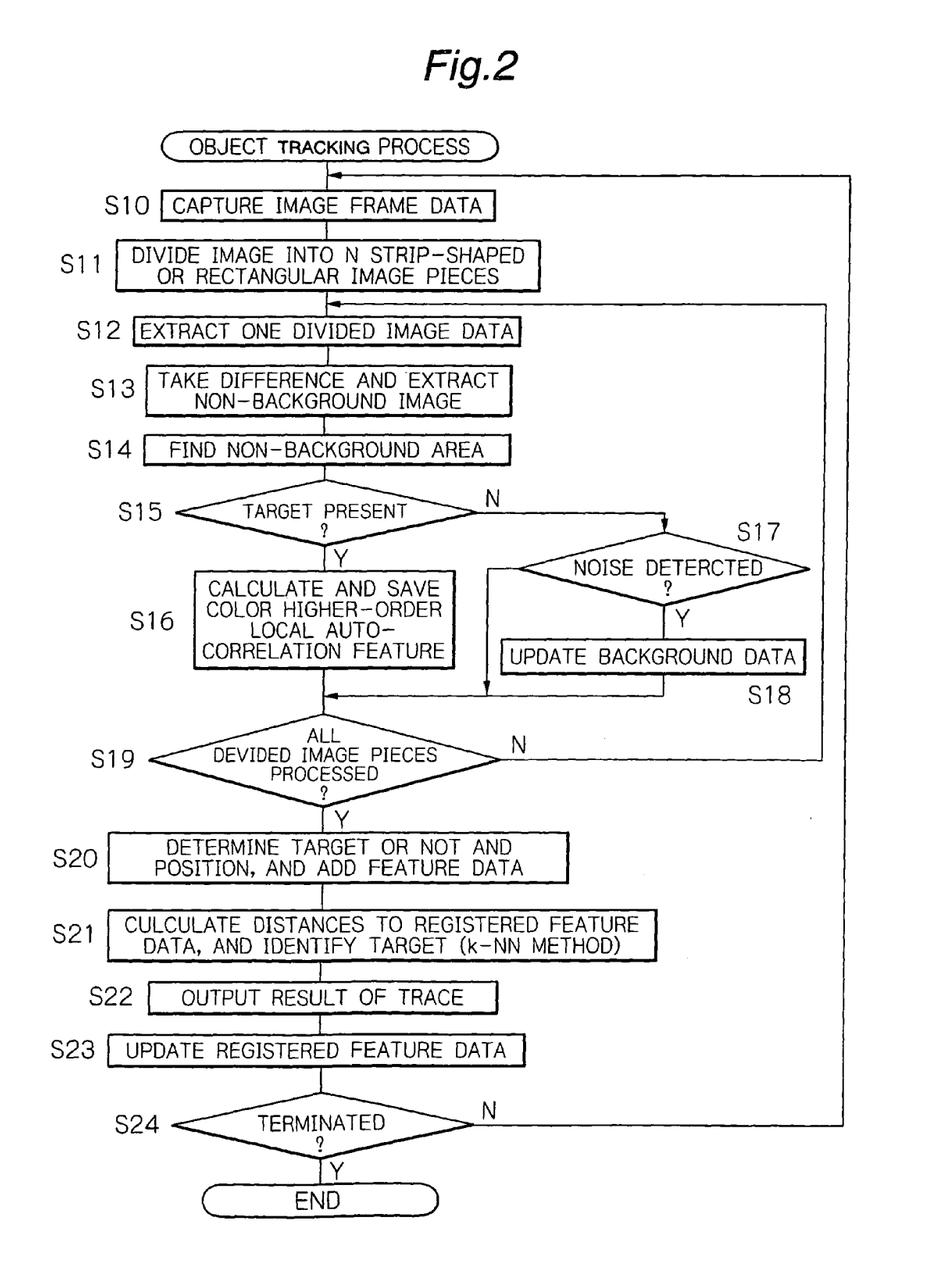
FIG. 2 is a flow chart illustrating details of a target tracking process of the present invention.

FIG. 2 is a flow chart illustrating details of a target tracking process of the present invention executed in the computer 12. While the embodiment discloses an example of tracking a person as a target to be tracked, the present invention can be applied to an arbitrary target to be tracked. At S10, image frame data is captured in real time from the video camera 10 using the video capture device 11.

At S11, the input video data is divided into N strip-shaped (divided only in the vertical direction) or rectangular (divided in the horizontal and vertical directions) image pieces. On boundaries along which the image is divided, the respective divided image pieces are defined to include one extra pixel for calculating feature data, later described. The size of the divided image pieces is chosen to be the same as or smaller than the target. When multiple targets exist, the image is divided into smaller pieces to improve the accuracy with which the targets are separated.

Figure 4:
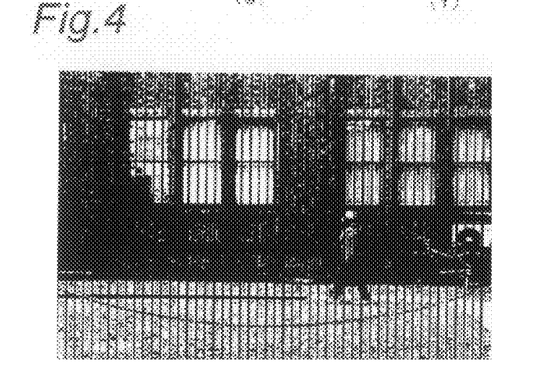
FIG. 4 is an explanatory diagram showing an example of input image divided into strip-shaped image pieces.

The process can be performed in parallel in the respective strip-shaped image pieces after the image has been divided, which is convenient for accomplishing real-time processing. Also, the feature data used by the present invention for identifying a target has additivity, and is extremely compatible with the division and combination of images. The following embodiment will be described in connection with an image divided into strip-shaped image pieces (divided only in the vertical direction). Also, assume that the image is divided, for example, into 40 pieces in the embodiment. FIG. 4 is an explanatory diagram illustrating an example of an image inputted to the computer 12 and divided into strip-shaped image pieces.

At S12, data of one divided image piece is read out. At S13, a difference is taken between the read data and a background image to extract a non-background image. A target to be tracked may be extracted by a method using an optical flow, an inter-frame differential method, a background differential method, or the like. However, since the optical flow based method requires a large amount of calculations and is vulnerable to noise, it is not so appropriate for extracting a target to be tracked. On the other hand, the inter-frame differential method has a problem that it fails to extract a target if the target stops moving. In contrast, the background differential method can correctly extract a target to be tracked even if it stops moving. Accordingly, the present invention employs the background differential method.

The background differential method is a method for finding a target to be processed by taking a difference between a background image previously provided by a certain method and a current input image. The background image may be an image which does not contain a target to be tracked and which may be previously inputted and saved. However, in actual scenes, a target to be tracked always exists in places where there are many streets and pedestrians, often making it difficult to find an image which does not include the target to be tracked. Even in such an event, it is necessary to estimate a background image which does not include the target to be tracked. For this purpose, a median value on time series may be taken for each pixel on a plurality of background images, rather than using the background image as it is. As will be later described, in the present invention, the background image is updated by replacing an image which does not include a target to be tracked in units of strip-shaped image pieces with the background.

Figure 5:
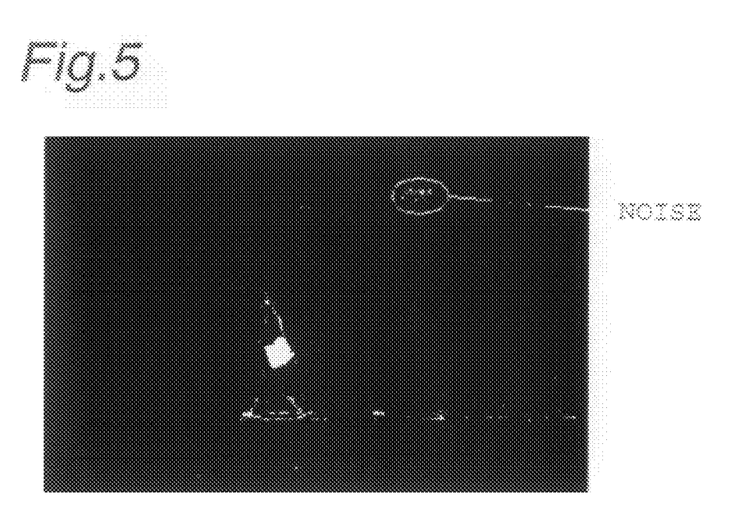
FIG. 5 is an explanatory diagram showing an example of non-background image (whole).

FIG. 5 is an explanatory diagram illustrating an example of a non-background image (whole) extracted from a plurality of divided image pieces. As a portion surrounded by a circle in the figure, there is "noise" which is extracted though no target to be tracked exists. In order to minimize the noise, the following processing is performed. In each strip-shaped image piece, a differential image $G_{ij}(x)$ is calculated in the following manner:

$$\text{If } |F_{ij}(x)-B_{ij}(x)|>\epsilon, \text{ then } G_{ij}(x)=F_{ij}(x),$$

$$\text{otherwise, } G_{ij}(x)=0 \qquad \text{[Equation 1]}$$

where $B_{ij}(x)$ represents a background image, $F_{ij}(x)$ (x=r,g,b) represents a current image, and a threshold e is a small value.

This processing is performed for R, G, B to generate a differential image $G_{ij}$. This processing reduces noise because small changes are not detected, thereby improving the accuracy with which the target is detected. In this respect, the background image changes over time due to the influence of illumination, sunlight, shadow and the like. Since such changes cannot be accommodated by the foregoing processing, the background image is updated at all times by processing, later described.

At S14, a non-background area is found. Specifically, since a differential pixel value is zero in a background area, the number of pixels other than zero is counted in the strip-shaped differential image. The counting processing at S14 may be performed simultaneously with the pixel-by-pixel determination processing at S13.

At S15, it is determined whether or not the target is likely to exist, based on whether or not the value of the non-background area (number of pixels) in each strip-shaped image piece is larger than a predetermined threshold. The process goes to S17 when the result of the determination is negative, whereas the process goes to S16 when affirmative. An optimal value for the predetermined threshold may be determined by an experiment, but is defined approximately one twentieth to one fifth of the number of pixels over the whole image of the target to be tracked (person) because the target must be detected even when it is divided across adjacent strip-shaped image pieces.

At S16, a color higher-order local auto-correlation feature is calculated and saved. The present invention can extract information on shape, extend the higher-order local auto-correlation feature, which has left actual results in the identification of individuals, to the color, and simultaneously extract information on both color and shape. The higher-order auto-correlation feature is an extension of the auto-correlation feature to higher orders, where the higher-order local auto-correlation feature is defined by the following Equation 2 for displacement directions $(a_1, \ldots, a_N)$.

$$x(a_1, \ldots, a_N)=\int f(r)f(r+a_1) \ldots f(r+a_N)dr \qquad \text{[Equation 2]}$$

where f(r) represents a target image within a screen.

An infinity of higher-order local auto-correlation features can be assumed depending on the order N, and how the displacement directions $(a_1, \ldots, a_N)$ are defined. However, since the image has a large local correlation, combination explosion is avoided only in local areas. While conventional higher-order local auto-correlation features have been extracted from binary images and contrast images, the present invention extends the higher-order local auto-correlation to the color for applying the same to color images.

Figure 3:
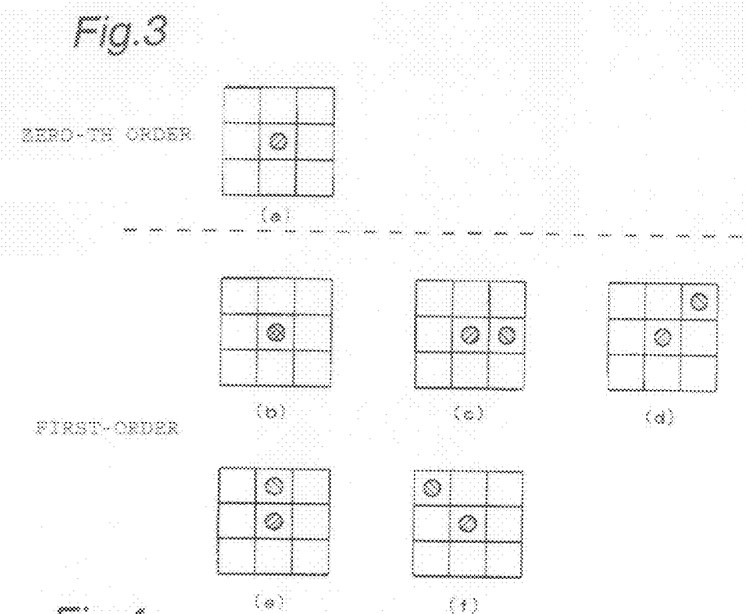
FIG. 3 is an explanatory diagram showing types of color higher-order local auto-correlation displacement vectors.

Assume now that a color image is represented by $\{f(i,j)=(r(i,j), g(i,j), b(i,j)|i\in I, j\in J\}$, where r(i,j), g(i,j), b(i,j) indicate luminances of a red (r), a green (g), and a blue (b) component at a pixel (i,j), respectively. While the embodiment employs the order of a color higher-order local correlation up to one at most, two or more may be employed. A zero-th order auto-correlation for a color image is defined by:

$$\begin{pmatrix} \bar{r} \\ \bar{g} \\ \bar{b} \end{pmatrix} = \frac{1}{IJ} \sum_{i\in I, j\in J} f(i, j) \qquad \text{[Equation 3]}$$

when it is normalized by the number of pixels. They are average values of the red, green, and blue components. In this way, three features can be found (FIG. 3(a)).

Also, a first-order auto-correlation feature is defined by:

$$\begin{pmatrix} \sigma_{rr} & \sigma_{rg} & \sigma_{rb} \\ \sigma_{gr} & \sigma_{gg} & \sigma_{gb} \\ \sigma_{br} & \sigma_{bg} & \sigma_{bb} \end{pmatrix} = \frac{1}{IJ} \sum_{i\in I, j\in J} f(i, j)f(i+a_m, j+a_n) \qquad \text{[Equation 4]}$$

assuming a displacement direction is $a=(a_m, a_n)$. While infinite possibilities can be contemplated depending on how to determine the displacement direction, it is limited to a local 3×3 local area about a reference point r. In other words, a displacement vector a takes such values as (0,0), (0,1), (1,0, (1,1), . . . .

The types of displacement vectors are limited to fives, shown in FIGS. 3(b)-3(f) after excluding displacement vector patterns which become equivalent through translations of the local area. From these patterns, six types of independent feature data are calculated for a pattern (b) identical to the zero-th order because there are three sets of values which duplicate due to a multiplication of the same pixel value, and nine types of independent feature data are calculated for four other patterns (c)-(f). Therefore, a total of 42 first-order local auto-correlation features are derived. Then, a combination of the zero-th order and first-order feature data results in a total of 45 data extracted from the image. The feature data is composed of these 45 values, and can be regarded as 45 dimensional feature vector data.

The calculation of each feature involves adding products of values of pixels corresponding to local patterns for all rectangular images, as expressed by "Equation 3" and "Equation 4." While this extraction of feature is a irreversible information compression for recognition, essential information not depending on the position of the target within the image is extracted in regard to the shape and color of the target, while irrelevant information is abstracted. With this information compression, robustness is expected against slight fluctuations of the target on an input image.

The feature data thus calculated has the following properties.

(1) Invariant in regard to the position. When the background is uniform, the feature value is the same irrespective of where the target is located within the image. Accordingly, the same feature amount is calculated from the whole image even if the target translates within the image.

(2) The additivity is satisfied in regard to a screen. The feature amount of the whole image is the sum of feature amounts of respective targets within the image. Stated another way, the sum of features at respective sites of the targets is equal to the feature of the whole image.

(3) A small amount of calculations is required.

(4) General features not depending on a recognition problem. A target to be recognized need not be identified in the event of feature extraction. This property ensures general-purpose properties of the system.

At S17, it is determined whether or not noise exists by determining whether or not the value of the non-background image (the number of pixels) in each strip-shaped image piece is larger than a predetermined second threshold. The process goes to S18 when the result of the determination is negative, and goes to S19 when affirmative.

At S18, the background data is updated using background data which does not include the target and includes substantially no noise. The updating method may involve simply overwriting for replacement, or employing a median value of pixel values of a plurality of near background data. At S19, it is determined whether or not divided image data have been fully processed, and the process goes to S12 when the result of the determination is negative, and goes to S20 when affirmative.

At S20, it is determined whether or not at least part of the target is included in the divided image pieces, and adjacent ones of those divided image pieces determined as including the target are collected to determine the position of the target, and feature data of these adjacent divided image pieces are all added to combine feature data of the target.

For example, considering a person who is walking, the person alternates a state with the feet opened back and forth and a nearly upright state. Paying attention to the tows, strip-shaped image pieces only containing the tows are regarded as if they were large noise, so that noise cannot be distinguished from the tows.

Thus, those strip-shaped image pieces which have been determined as including the target are again divided into two groups "large" and "middle" according to the size of the non-background area, and a determination is made as to whether there is part of the target or noise according to the size of the non-background areas in adjacent strip-shaped image pieces ("large," "middle," "small" (target not included)). Specifically, "large" is regarded as part of the target, and is added to adjacent "large" or "middle." "Middle" is regarded as part of the target if there is adjacent "large," and added to adjacent "large," but is regarded as noise when both adjacent image pieces are "middle" or "small."

When there is only one "large" image piece, this can represent a target to be tracked, which is different from the target person (for example, a bird or the like). In this event, it may be determined whether or not the image piece includes the target, for example, based on the size of the background area, the length of the feature vector, and the like. An optimal threshold between "large" and "middle" may be determined by an experiment because it depends on a target to be tracked, the size of an input image, a dividing method, and the like.

The foregoing process results in the extraction of a plurality of adjacent strip-shaped image pieces which include the target, and can recognize that the target exists in the area of these strip-shaped image pieces. Also, by simply adding feature data previously extracted in the respective strip-shaped image pieces in which the target exists, feature data of the whole image can be acquired. This is because the feature data has the additivity.

At S21, the distance to the previously registered feature vector of the target is calculated to identify the target. Before the identification, the derived feature data (vector x) is normalized. Here, the normalization refers to the processing for making the norm equal to one, specifically, dividing the value of each element of the feature vector x by the value of the norm. The norm represents the length of the feature vector defined by the following Equation 5.

$$\|x\| = \sqrt{\sqrt{x_1^2 + x_2^2 + \ldots + x_N^2}} \quad [\text{Equation 5}]$$

Specifically, a point at which the extracted feature of the target is plotted on a feature space is carried on a unit sphere about the origin on the feature space. In doing so, the distance is zero with identical feature data, and the distance to the origin is one. In other words, the target can be identified through simple processing that the similarity is higher as the distance is closer to zero. Also, this makes the identification robust even to slight fluctuations due to the distance to the target.

A k-NN method employed in the embodiment for identifying a target involves holding and updating several feature data for all recently detected targets, while extracting k feature data closest to a feature vector which should be discriminated, and determining that the largest number of feature data belong to the extracted target among them. In this way, the identification can be made robust to a change in the shape of the target, resulting from a motion such as walking.

Since the k-NN method registers a plurality of feature data for each target as they are, and compares the distances to the respective ones, a plurality of feature data are registered in regard to different postures during walking when the target to be tracked is a person, and gait (manner of walking) can also be utilized for the identification.

In the following, the k-NN method will be described. Assume now that n feature data have been registered together with classes (i.e., target ID, A or B) to which they belongs, for each of targets A, B. Distances between feature data x of the targets extracted from an image and the respective registered feature data are calculated and ordered from the shortest distance. Then, the first k (k is an odd number) feature data are extracted, and a majority decision is made on the classes of the feature data, and the class which appears most frequently is determined as the class to which the target belongs.

For example, with k equal to five, when the five closest feature data include three which belong to class A, and two which belong to class B, it is determined that the target belongs to class A. When the shortest distance is larger than a predetermined value, the feature data is determined as not belonging to any of the currently registered targets, and a new target is registered. Since this approach continues to hold recent information on the targets to be tracked, the targets can be tracked with stability. Since registered information increases each time a new target is registered, registered information may be deleted if a target belonging to the registered information has not been detected even after the lapse of a certain time.

At S22, the result of the trace is outputted. The result includes, for example, information such as the position of the target on a current image, a trajectory of the target, and the like. At S23, the registered feature data are updated. When the class of the target is determined, the least recent one is deleted from registered data of this class, and most recent feature data is registered to update the feature data. At S24, it is determined whether or not the process is terminated, for example, based on whether or not a manager manipulates for terminating the process. The process goes to S10 when the result of the determination is negative, whereas the process is terminated when affirmative.

Second Embodiment

Next, a second embodiment will be described. While the presence or absence of a target, and the like are determined based on the non-background area of divided image pieces in the first embodiment, feature data are calculated from background differential images of all divided image pieces to determine the presence or absence of a target based on the feature data.

Figure 6:
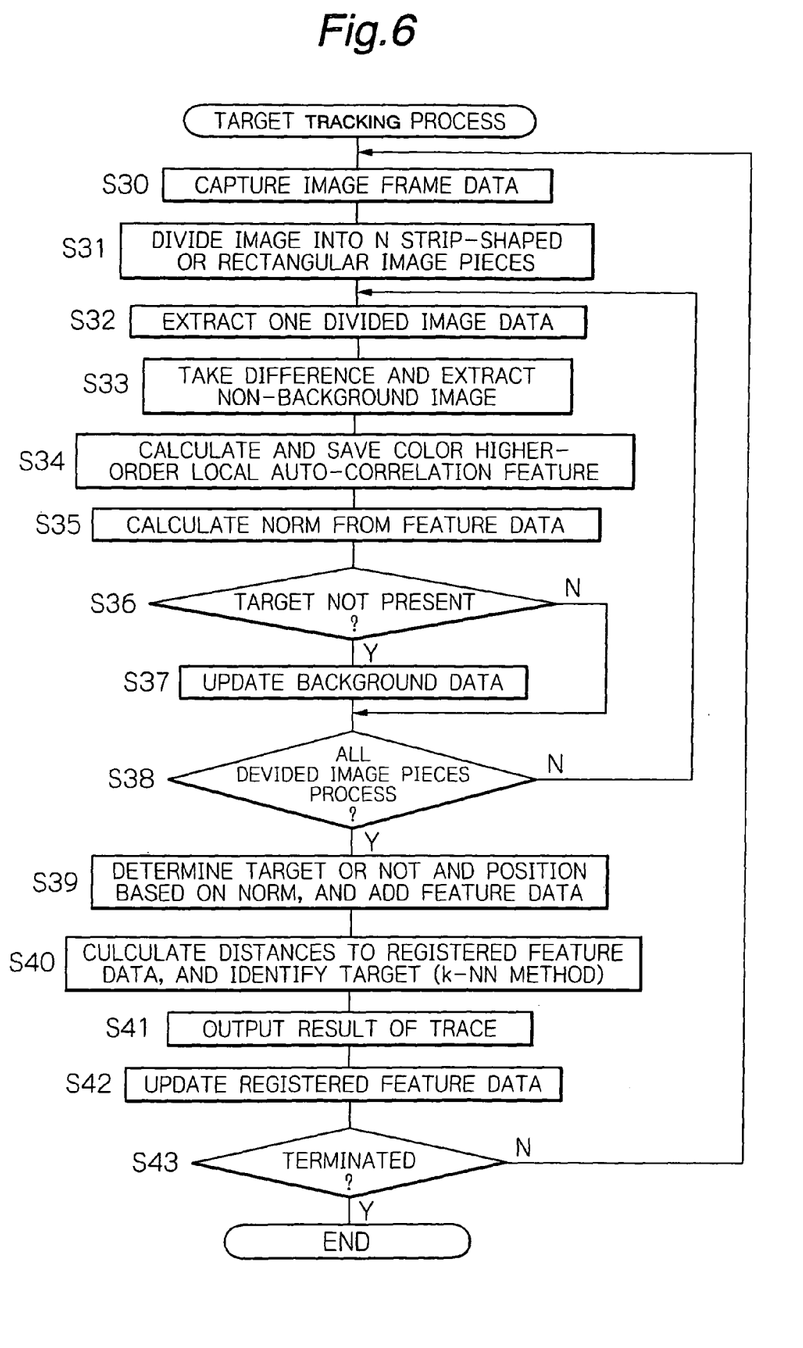
FIG. 6 is a flow chart illustrating details of a tracking process according to a second embodiment of the present invention.

FIG. 6 is a flow chart illustrating details of a target tracking process according to the second embodiment of the present invention. Since this process differs from the first embodiment in S34-S37 and S39, processing at these steps will be described. At S34, a color higher-order local auto-correlation feature is calculated and saved by similar processing to that at S16 in FIG. 2. This processing is performed for all divided image pieces. At S35, the aforementioned norm is calculated.

At S36, it is determined whether or not at least part of a target can exist within divided image pieces based on whether or not the norm is equal to or larger than a predetermined value. The process goes to step S38 when the result of the determination is negative, whereas the process goes to S37 when affirmative. At S37, background data is updated using background data in which the target does not exist and which is substantially free from noise, in a manner similar to S18.

At S39, the norm is used to estimate the position of the target. With the background difference, an image including the target to be tracked results in a large norm of a feature derived from a generated non-background image, while an image not including the target to be tracked results in a small norm of such a feature. In other words, it is found in which strip-shaped image piece the target to be tracked exists by comparing the magnitudes of the norms of the respective strip-shaped image pieces with one another.

For this purpose, the norms are divided into those close to zero, middle ones, and large ones. A large norm is associated with a strip-shaped image piece in which a target to be tracked exists; a norm close to zero with a strip-shaped image piece in which no target to be tracked exists; and a middle norm with a strip-shaped image piece which includes large noise or (part of) a target to be tracked. Then, when a strip-shaped image piece is adjacent to a strip-shaped image piece having a large norm and has a middle norm, this strip-shaped image piece is regarded as including part of the target. When a strip-shaped image piece is spaced apart from a strip-shaped image piece having a large norm and has a middle norm, this strip-shaped image piece is regarded as including noise.

In doing so, a target to be tracked can be correctly tracked even if the target varies in width over time, like a person. Also, for acquiring features of a target, the features of the whole target can be acquired by simply adding feature data which have been previously extracted in strip-shaped image pieces which include the target to be tracked.

Next, the result of an experiment will be described. The result of the experiment made by the inventors using color moving images can demonstrate that a target can be basically tracked without problem in regard to a simple hidden target. An experiment was also made on a target to be tracked which was replaced with another target (person) when the target returned from a hidden state. As a result, when the person returned from the hidden state was replaced with another person, a different person was determined. When the original person appeared again at a later time, this person was correctly discriminated and tracked. Thus, it can be demonstrated that even if a target is suddenly replaced with another target, the target can be correctly discriminated and tracked. Further, when a target person passes by a different person, the target person cannot be satisfactorily recognized because strip-shaped image pieces including the target to be tracked are connected to one another (a person in front is often identified as the target). However, after the target person has passed by the different person, the target can be well recognized and could be continuously tracked without problems.

While the foregoing description has been given of embodiments for tracking a moving target such as a person, the following modifications are also contemplated in the present invention. The embodiments do not use information on the position of a detected target in the next tracking process. As such, a target position estimation function based on action prediction may be added for storing information on the location at which a target is currently present, and information on locations to which the target is likely to move, for effective utilization in subsequent identification. With this function, a large amount of calculations can be further reduced.

Also, while the embodiments extract information on color and shape in the form of the color higher-order local auto-correlation feature and utilizes a feature on a time base such as gait in the k-NN identification method, "weighting" may also be used. Specifically, in the embodiments, composite features such as color, shape, and gait are used at predetermined proportions to totally identify a target, but the weighting may be changed (multiplied) in accordance with the importance of features depending on situations to accomplish more reliable identification.

The invention claimed is:
1. A tracking apparatus characterized by comprising:
   tracking a moving target from moving images in real time;
   image dividing means for dividing input moving image data to generate divided image data;
   extracting means for extracting background image data and different non-background image data from the divided image data;

target presence/absence determining means for determining whether or not at least part of a target to be tracked is included in the divided images based on an output of said extracting means;

feature data calculating means for calculating color higher-order local auto-correlation feature data for non-background image data determined to include the target;

a target position determining means for collecting adjacent divided images determined to include the target to determine the position of the target to be tracked;

an adding means for adding the feature data of the collected non-background image data;

and identifying means for identifying the target to be tracked based on a distance between feature data of the registered target to be tracked and an output of said adding means.

2. A tracking apparatus characterized by comprising:

tracking a moving target from moving images in real time;

image dividing means for dividing input moving image data to generate divided image data;

extracting means for extracting background image data and different non-background image data from the divided image data;

feature data calculating means for calculating color higher-order local auto-correlation feature data for the non-background image data;

norm calculating means for calculating a norm which is the length of a feature data vector from the color higher-order local auto-correlation data;

target presence/absence determining means for determining whether or not at least part of a target to be tracked is included in divided images based on an output of said norm calculating means;

target position determining means for collecting adjacent divided images determined to include the target to determine the position of the target;

adding means for adding the feature data of the collected non-background image data;

and identifying means for identifying the target to be tracked based on a distance between the feature data of the registered target to be tracked and an output of said adding means.

3. A tracking apparatus according to claim 1 characterized by comprising background image updating means for updating the background image based on the divided images which are determined not to include the target to be tracked by said target presence/absence determining means.

4. A tracking apparatus according to claim 1, characterized in that said identifying means comprises:

saving means for saving a plurality of close feature data for each target to be tracked;

most recent feature data extracting means for calculating distances of all the saved feature data and feature data of a detected target to be tracked, respectively, to extract an odd number of feature data which have the shortest distance; and target identifying means for determining that the detected target belongs to a target to be tracked which has the largest number of feature data within the odd number of extracted feature data.

5. A tracking apparatus according to claim 1, characterized by comprising registered target updating means for updating feature data of the registered targets to be tracked based on the result of the identification of said identifying means.

6. A tracking program stored on computer readable medium, characterized by causing a computer to function as:

image dividing means for dividing input moving image data to generate divided image data;

extracting means for extracting background image data and different non-background image data from the divided image data;

target presence/absence determining means for determining whether or not at least part of a target to be tracked is included in the divided images based on an output of said extracting means;

feature data calculating means for calculating color higher-order local auto-correlation feature data for non-background image data determined to include the target;

a target position determining means for collecting adjacent divided images determined to include the target to determine the position of the target to be tracked;

an adding means for adding the feature data of the collected non-background image data; and identifying means for identifying the target to be tracked in real time based on a distance between feature data of the registered target to be tracked and an output of said adding means.

7. A tracking program stored on computer readable medium, characterized by causing a computer to function as:

image dividing means for dividing input moving image data to generate divided image data;

extracting means for extracting background image data and different non-background image data from the divided image data;

feature data calculating means for calculating color higher-order local auto-correlation feature data for the non-background image data;

norm calculating means for calculating a norm which is the length of a feature data vector from the color higher-order local auto-correlation data;

target presence/absence determining means for determining whether or not at least part of a target to be tracked is included in divided images based on an output of said norm calculating means;

target position determining means for collecting adjacent divided images determined to include the target to determine the position of the target;

adding means for adding the feature data of the collected non-background image data; and identifying means for identifying the target to be tracked in real time based on a distance between the feature data of the registered target to be tracked and an output of said adding means.

8. A tracking method characterized by comprising the steps of:

tracking a moving target from moving images in real time;

dividing input moving image data to generate divided image data;

extracting background image data and different non-background image data from the divided image data;

determining whether or not at least part of a target to be tracked is included in the divided images;

calculating color higher-order local auto-correlation feature data for non-background image data determined to include the target;

collecting adjacent divided images determined to include the target to determine the position of the target to be tracked;

adding the feature data of the collected non-background image data; and identifying the target to be tracked based on a distance between feature data of the registered target to be tracked and the outputted sum.

9. A tracking method characterized by comprising the steps of:

tracking a moving target from moving images in real time;

dividing input moving image data to generate divided image data;

extracting background image data and different non-background image data from the divided image data;

calculating color higher-order local auto-correlation feature data for the non-background image data;

calculating a norm which is the length of a feature data vector from the color higher-order local auto-correlation data;

determining whether or not at least part of a target to be tracked is included in divided images based on the norm;

collecting adjacent divided images determined to include the target to determine the position of the target;

adding the feature data of the collected non-background image data; and identifying the target to be tracked based on a distance between the feature data of the registered target to be tracked and the outputted sum.

* * * * *

UNITED STATES PATENT AND TRADEMARK OFFICE
CERTIFICATE OF CORRECTION

| | | |
|---|---|---|
| PATENT NO. | : 7,957,557 B2 | Page 1 of 1 |
| APPLICATION NO. | : 11/792084 | |
| DATED | : June 7, 2011 | |
| INVENTOR(S) | : Otsu et al. | |

It is certified that error appears in the above-identified patent and that said Letters Patent is hereby corrected as shown below:

Title page Item (22) PCT Filed: December 9, 2005 should read:

(22) PCT Filed: September 12, 2005

Signed and Sealed this

Twentieth Day of December, 2011

David J. Kappos
*Director of the United States Patent and Trademark Office*